US011525510B2

(12) United States Patent
Stein et al.

(10) Patent No.: US 11,525,510 B2
(45) Date of Patent: Dec. 13, 2022

(54) PISTON RINGS

(75) Inventors: Uwe Bernhard Pascal Stein, Mid-Lothian (GB); Luke Wadsley, Ames, IA (US)

(73) Assignee: Danfoss Power Solutions ApS, Nordborg (DK)

(*) Notice: Subject to any disclaimer, the term of this patent is extended or adjusted under 35 U.S.C. 154(b) by 2256 days.

(21) Appl. No.: 12/686,026

(22) Filed: Jan. 12, 2010

(65) Prior Publication Data
US 2010/0175551 A1    Jul. 15, 2010

(30) Foreign Application Priority Data

Jan. 13, 2009   (EP) .................................... 09275002

(51) Int. Cl.
| | | |
|---|---|---|
| F16J 1/00 | (2006.01) | |
| F16J 9/12 | (2006.01) | |
| F16J 9/10 | (2006.01) | |

(52) U.S. Cl.
CPC ........................................ F16J 9/10 (2013.01)

(58) Field of Classification Search
CPC ...... F16J 9/06; F16J 9/061; F16J 9/062; F16J 9/063; F16J 9/064; F16J 9/065; F16J 9/066; F16J 9/067; F16J 9/068; F16J 9/069; F16J 9/10; F16J 9/145; F16J 1/00; F16J 9/12
USPC .................. 92/192, 172; 277/467, 469, 470, 277/477–481, 482
See application file for complete search history.

(56) References Cited

U.S. PATENT DOCUMENTS

| | | | |
|---|---|---|---|
| 256,312 A | 4/1882 | Garrett | |
| 2,191,697 A * | 2/1940 | Malpas | F16J 9/06 277/449 |
| 2,311,559 A * | 2/1943 | Mason | F16J 9/203 277/484 |
| 2,357,854 A | 9/1944 | Sullivan | |
| 3,124,502 A * | 3/1964 | Radke | 428/66.4 |
| 3,625,526 A * | 12/1971 | McCormick | F16J 9/203 277/445 |
| 3,735,992 A * | 5/1973 | Prostorov | F16J 9/20 277/464 |
| 4,079,949 A * | 3/1978 | McCormick | 277/463 |
| 4,139,205 A * | 2/1979 | Duck et al. | 277/481 |
| 4,256,067 A * | 3/1981 | Fukui | F16J 9/00 123/193.6 |
| 4,669,369 A * | 6/1987 | Holt | F02F 7/0085 123/193.6 |
| 4,966,068 A * | 10/1990 | Ficht | F02F 7/0087 123/193.6 |
| 5,079,994 A * | 1/1992 | Berbuer | F04B 1/1071 91/491 |
| 7,140,291 B2 * | 11/2006 | Dunaevsky et al. | 92/253 |

(Continued)

FOREIGN PATENT DOCUMENTS

| | | |
|---|---|---|
| EP | 0 335 791 A1 | 10/1989 |
| FR | 445 889 A | 11/1912 |

*Primary Examiner* — Dominick L Plakkoottam
*Assistant Examiner* — Charles W Nichols
(74) *Attorney, Agent, or Firm* — McCormick, Paulding & Huber PLLC

(57) ABSTRACT

A piston ring (10) for forming a seal between a piston (26) and piston housing (28). The piston ring (10) has first and second orthogonal axes (12, 14) and a body portion (18) which is resiliently deformable in the direction of the first axis (12) and is substantially rigid in the direction of the second axis (14).

18 Claims, 4 Drawing Sheets

(56) References Cited

U.S. PATENT DOCUMENTS

2006/0120885 A1* 6/2006 Sakikawa et al. ............ 417/269
2009/0013866 A1* 1/2009 Kariya ............................ 92/172

* cited by examiner

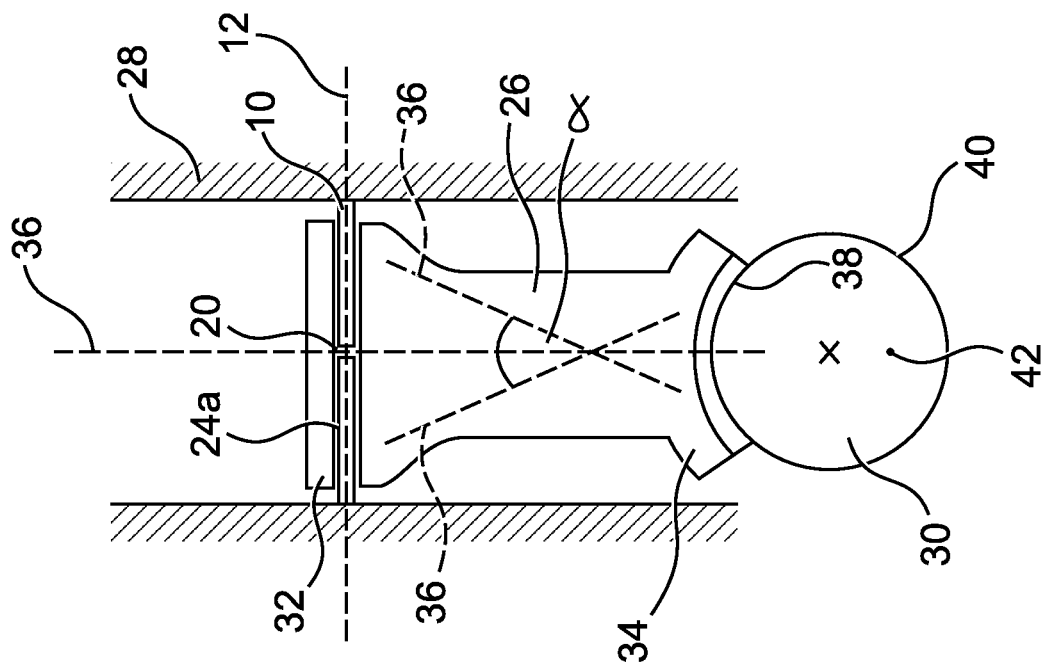
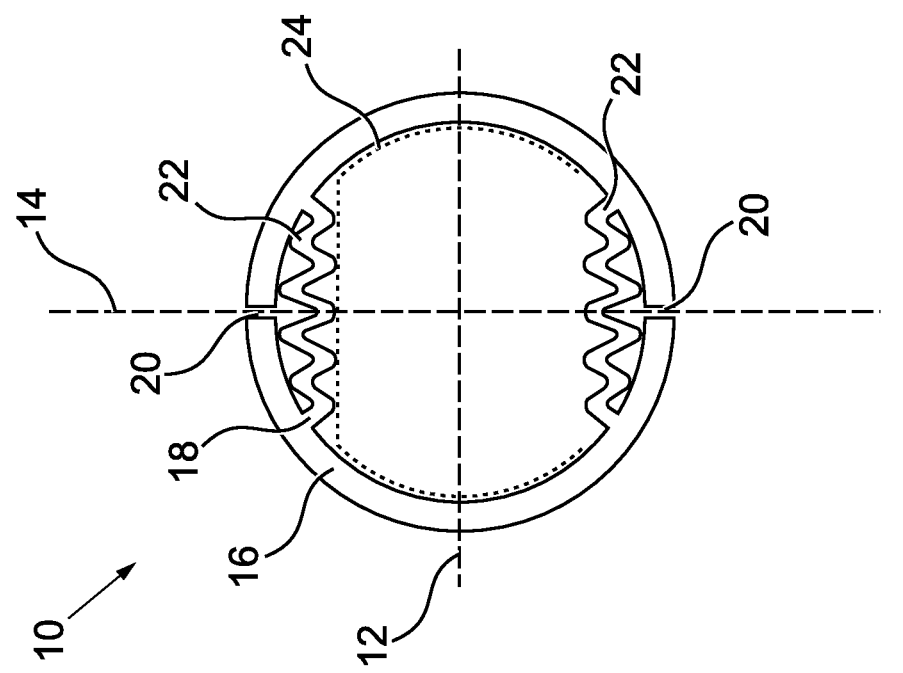
Fig. 2
Fig. 1

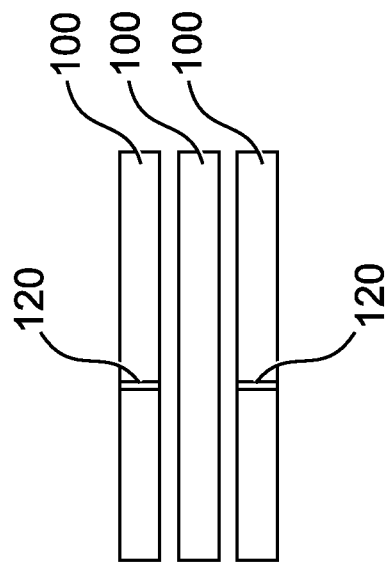
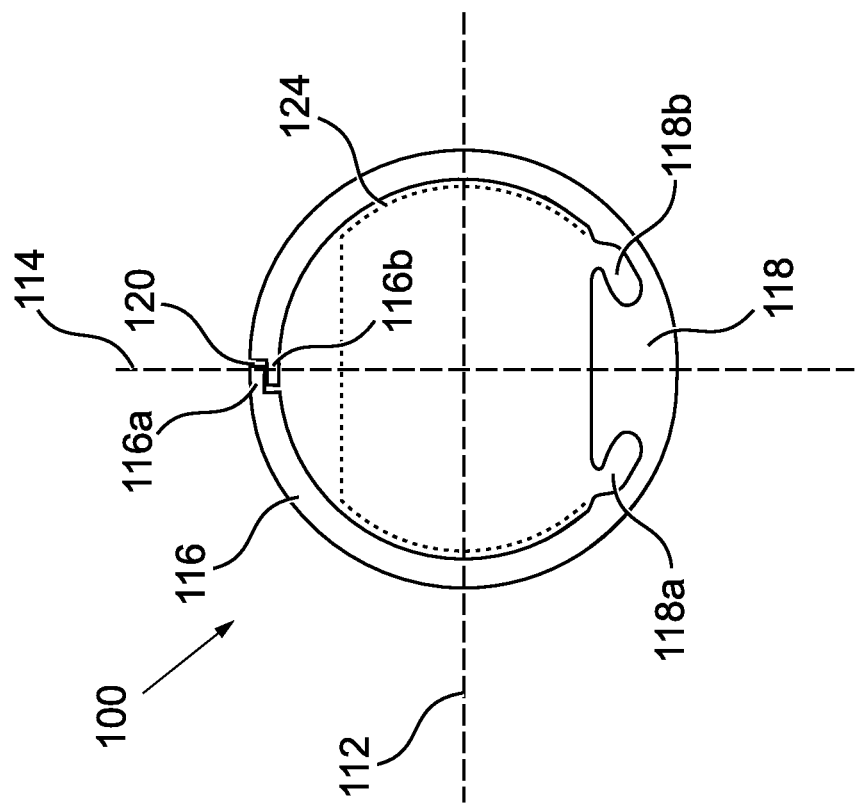

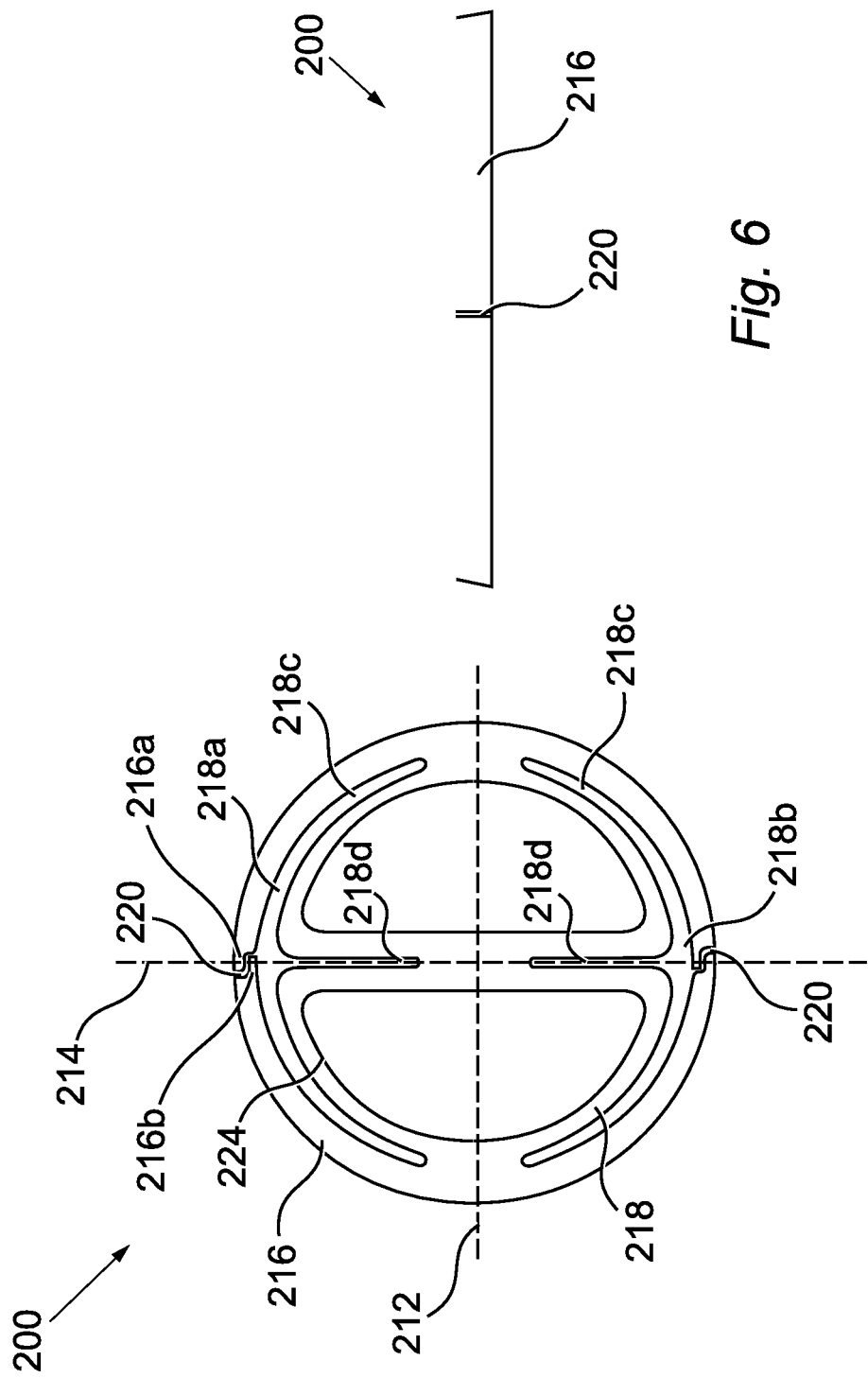

PISTON RINGS

CROSS REFERENCE TO RELATED APPLICATION

Applicant hereby claims foreign priority benefits under U.S.C. § 119 from European Patent Application No. 09275002.5 filed on Jan. 13, 2009, the contents of which are incorporated by reference herein.

FIELD OF THE INVENTION

The present invention relates to a piston ring for forming a circumferential seal between a piston and a piston housing, particularly, but not exclusively, to a piston ring for forming a circumferential seal between a piston and a piston housing in a radial piston machine.

BACKGROUND OF THE INVENTION

In a radial piston machine the pistons are radially directed towards the eccentric crankshaft. The pistons may cooperate with the crankshaft in a number of ways, e.g. the base of the piston may slide along a contact point on the crankshaft bearing, or the piston may be configured to pivot, or rock, within the piston housing.

A known problem with radial piston machines of the type described above is that they are large in diameter, heavy and expensive to manufacture.

In order to reduce the size of the machine it is known to use "bent-axis" pistons, in which each piston pivots within the piston cylinder as the crankshaft rotates. Bent-axis pistons allow the length of the piston cylinders to be reduced, as they do not require a minimum length/diameter ratio to maintain the piston in alignment with cylinder. This provides a more compact machine. However, allowing the piston to pivot within the piston cylinder introduces new problems, such as increased friction between the piston and piston cylinder, sealing problems between the piston and piston cylinder and excessive stresses applied to the piston rings, which are required to undergo rapid elliptical deflections. Increasing the friction between the piston and piston cylinder reduces the efficiency and lifespan of the machine. Pivoting the piston within the piston cylinder makes creating a seal between the piston and the piston cylinder more difficult, which results in higher leakage and reduced efficiency of the machine. Also, pivoting the piston within the piston cylinder makes it difficult to maintain a sealing line which is perpendicular to the axis of the piston. If the sealing line is not perpendicular to the axis of the piston, side-load forces are applied to the piston, which increases the friction between the piston and the piston cylinder. As the piston pivots in the piston cylinder the piston ring has to rapidly change between an elliptical and circular shape. The ability of the piston ring to assume these shapes directly affects the leakage and efficiency of the machine. The further the shape of the piston ring is away from a "perfect" ellipse or circle, the higher the leakage of the machine. Applying excessive stresses to the piston rings reduces their lifespan and increases the risk of failure of the ring.

SUMMARY OF THE INVENTION

Replacing piston rings is costly, especially if a failure occurs during operation of the machine. Piston ring failure during operation is also potentially very dangerous. It is an object of the present invention to provide a piston ring which obviates or mitigates one or more of the disadvantages referred to above. According to a first aspect of the present invention there is provided a piston ring for forming a seal between a piston and a piston housing, said piston ring having first and second orthogonal axes and a body portion which is resiliently deformable in the direction of said first axis and is substantially rigid in the direction of the second axis.

In this way the body portion is relatively less resiliently deformable in the direction of the second axis than in the direction of the first axis, but is sufficiently resiliently deformable in the direction of the second axis to allow the piston ring to form a circumferential seal between the piston and the piston housing.

Preferably, said piston ring is deformable between a first state in which an outer circumference of said piston ring is substantially elliptical and a second state in which said outer circumference of said piston ring is substantially circular.

Preferably, a major axis of said ellipse aligns with said first axis and a minor axis of the ellipse aligns with said second axis.

Preferably, said piston ring includes at least one gap located in an outer circumferential surface thereof to assist in the deformation of said body portion.

Preferably, said piston ring includes two gaps, wherein said gaps are diametrically opposed from one another and are located on said second axis.

Preferably, said body portion comprises at least one biasing element, said at least one biasing element being configured to allow said body portion to be resiliently deformable in the direction of said first axis and to be substantially rigid in the direction of said second axis.

Preferably, said at least one biasing element biases said piston ring towards said first state.

Preferably, said at least one biasing element is integrally formed with said body portion. Alternatively, said at least one biasing element is formed as a separate element therefrom.

Preferably, said body portion comprises two biasing elements, wherein said biasing elements are located on opposite sides of said first axis.

Preferably, said biasing element is a spring member.

Preferably, said body portion comprises at least one cavity therein, said at least one cavity being configured to allow said body portion to be resiliently deformable in said direction of said first axis and to be substantially rigid in said direction of said second axis.

Preferably, in said second state, said body portion biases said piston ring towards said first state.

Preferably, said at least one cavity includes a first portion which extends in a circumferential direction and a second portion which extends in a radial direction.

Preferably, in use, said body portion of said piston ring contacts an inner and/or outer surface of said piston, to prevent deformation of said body portion in the direction of said second axis.

Preferably, said body portion has an inner circumferential surface which is shaped so as to engage with a complimentary shaped inner and/or outer surface of a piston such that relative rotational movement between said piston ring and said piston is prevented.

Preferably, said piston ring has a circular cross section in said direction of said first or second axes. Alternatively, said piston ring has a trapezoidal cross section in said direction of said first or second axes. Alternatively, said piston ring has a rectangular cross section in said direction of said first or second axes.

Preferably, said piston ring is substantially symmetrical about said first axis and/or said second axis.

According to a second aspect of the present invention there is provided a piston assembly comprising: a piston; a piston housing; and at least one piston ring according to the first aspect of the present invention.

Preferably, said piston is substantially cylindrical. Alternatively, said piston is substantially spherical.

Preferably, said piston housing is substantially cylindrical.

Preferably, said piston is non-rotatable relative to said piston housing.

According to a third aspect of the present invention there is provided a radial piston machine comprising:

at least one piston;
at least one piston housing; and
at least one piston ring according to the first aspect of the present invention.

Preferably, said piston is non-rotatable relative to said piston housing.

Preferably, said radial piston machine is a radial piston hydraulic machine.

BRIEF DESCRIPTION OF THE DRAWINGS

Embodiments of the present invention will now be described, by way of example only, with reference to the accompanying drawings, in which:

FIG. 1 is a top view of a piston ring for forming a circumferential seal between a piston and a piston housing according to a first embodiment of the invention;

FIG. 2 is a side view of the piston ring of FIG. 1 mounted to a piston of a radial piston machine, a piston housing and an eccentric crankshaft;

FIG. 3 is a top view of a piston ring for forming a circumferential seal between a piston and a piston housing according to a second embodiment of the invention;

FIG. 4 is a side view of a stack of three piston rings of FIG. 3;

FIG. 5 is a top view of a piston ring for forming a circumferential seal between a piston and a piston housing according to a third embodiment of the invention; and FIG. 6 is a first side view of the piston ring of FIG. 5 in a direction of a first axis of the piston ring.

DETAILED DESCRIPTION OF THE PREFERRED EMBODIMENTS

Figure 7:
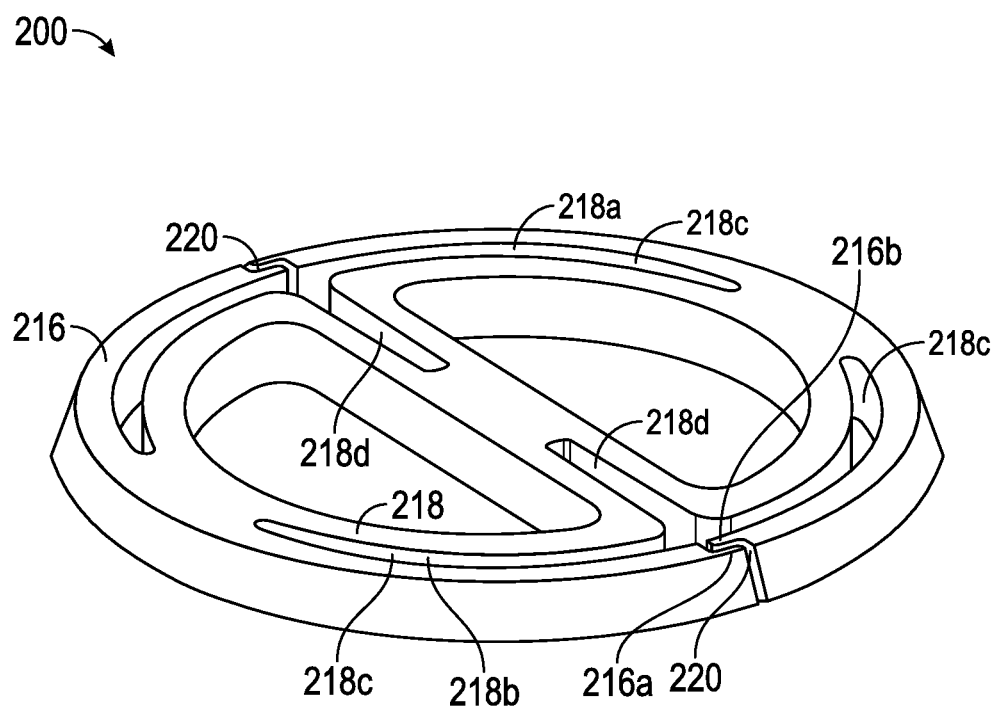
FIG. 7 is a second side view of the piston ring of FIG. 5 in a direction of a second axis of the piston ring.

FIG. 1 illustrates a piston ring 10 for forming a circumferential seal between a piston and a piston housing, or piston cylinder. The piston ring 10 has first and second orthogonal axes 12, 14 which are coplanar with the piston ring 10.

The piston ring 10 has an outer portion 16 and a body portion 18. The outer portion 16 is split along the second axis 14, such that two diametrically opposed gaps 20 are formed in the piston ring 10. The gaps 20 may be formed between two overlapping portions (not shown) of the outer portion 16 to reduce leakage through the piston ring 10.

The body portion 18 includes two spring members 22 (an example of a biasing element) which are integrally formed with the outer portion 16 of the piston ring 10 and located on opposite sides of the first axis 12. The arrangement of the spring members 22 allows the body portion 18 to be resiliently deformable in the direction of the first axis 12 and substantially rigid in the direction of the second axis 14. The two diametrically opposed gaps 20 aid the deformation of the body portion 18 in the direction of the first axis 12.

As illustrated in FIG. 1, the piston ring 10 is substantially symmetrical about both the first and second axes 12, 14. Making the piston ring 10 symmetrical about these axes ensures that the piston ring 10 has an even weight distribution. This reduces vibrations between the piston and piston housing during use.

The piston ring 10 is deformable between a first state in which an outer circumference of the piston ring 10 is substantially elliptical and a second state in which the outer circumference of the piston ring 10 is substantially circular. In the first state, the major axis of the ellipse aligns with the first axis 12 and the minor axis of the ellipse aligns with the second axis 14.

The spring members 22 apply a biasing force to the outer portion 16 of the piston ring 10 in the direction of the first axis 12. The spring members 22 thus bias the piston ring 10 towards the first state, i.e. the piston ring 10 assumes an elliptical shape when de-energised.

The body portion 18 has an inner circumferential surface 24 which is shaped to engage with a complimentary shaped inner and/or outer surface of a piston. The inner circumferential surface 24 in the embodiment illustrated in FIG. 1 has a circumference which is substantially rectangular. Mounting the piston ring 10 to a piston having an outer circumference which is also rectangular prevents any rotational movement between the piston ring 10 and the piston.

FIG. 2 illustrates the piston ring 10 mounted to a piston 26 of a radial piston machine (not shown), a piston housing 28 and an eccentric crankshaft 30.

The piston 26 has a head 32, a base 34 and a longitudinal axis 36. The piston head 32 and the piston housing 28 are cylindrical.

The piston ring 10 is fitted to the piston head 32 such that the two diametrically opposed gaps 20 are in line with the longitudinal axis 36.

The first and second axes 12, 14 of the piston ring 10 are therefore both perpendicular to the longitudinal axis 36 of the piston 26. The inner circumferential surface 24 of the piston ring 10 also engages with the complimentary shaped outer surface 24a of the piston 26. As described above, this prevents the piston ring 10 rotating relative to the piston 26. In order to fit the piston 26 and piston ring 10 into the piston housing 28, it is necessary to deform the piston ring 10 from its elliptical first state to its circular second state. When the piston ring 10 is in the piston housing 28 it may be considered as being energised, i.e. the spring elements 22 apply a biasing force to the outer portion 16 to try and force the piston ring 10 to assume its elliptical first state.

The piston base 34 is adapted to engage and cooperate with the eccentric crankshaft 30, or part thereof. The piston base 34 is formed to have a cylindrical partial surface 38 which engages with a corresponding outer surface 40 of the eccentric crankshaft 30. In use, the piston base 34 therefore slides over the outer surface 40 of the eccentric crankshaft 30 as it rotates.

The eccentric crankshaft 30 rotates about a crankshaft axis 42 which is perpendicular to the longitudinal axis 36 of the piston 26 and parallel to the second axis 14 of the piston ring 10.

As the crankshaft 30 rotates, the piston 26 translates and tilts within the piston housing 28. As illustrated in FIG. 2, the longitudinal axis 36 of the piston 26 sweeps through an angle $\alpha$ during each stroke.

The piston base 34 and eccentric crankshaft 30 are arranged to engage and cooperate with one another such that the piston 26 is prevented from rotating about its longitudinal axis 36 as the crankshaft 30 rotates. This ensures that during operation the second axis 14 of the piston ring 10 remains parallel with the crankshaft axis 42. As explained above, the piston ring 10 is prevented from rotating relative to the piston 26.

As the piston 26 translates and tilts within the piston housing 28, the shape of the circumferential sealing perimeter between the piston 26 and the piston housing 28 oscillates between a circle and an ellipse, with the ellipse having major and minor axes which align with the first and second axes 12, 14, respectively, of the piston ring 10.

In order to provide sufficient sealing between the piston 26 and the piston housing 28, the piston ring 10 must therefore be able to oscillate between a circle and an ellipse.

However, since the piston ring 10 does not rotate within the piston housing 28, the piston ring 10 is essentially only required to deform along its first axis 12. Therefore, the body portion 18 is resiliently deformable in the direction of the first axis 12 and relatively less resiliently deformable in the direction of the second axis 14. However, it should be appreciated that, in order for the piston ring 10 to provide a sufficient circumferential seal, the body portion 18 must be sufficiently resiliently deformable in the direction of the second axis 14 such that the piston ring 10 applies a sealing force to the piston housing 28 in the direction of the second axis 14.

FIG. 3 illustrates an alternative embodiment of the piston ring 10 of FIG. 1. The piston ring 100 has first and second orthogonal axes 112, 114 which are coplanar with the piston ring 100.

The piston ring 100 has an outer portion 116 and a body portion 118. The outer portion 116 is split along the second axis 114, such that a gap 120 is formed in the piston ring 100.

The body portion 118 includes two cavities 118a, 118b. The cavities 118a, 118b allows the body portion 118 to be resiliently deformable in the direction of the first axis 112 and substantially rigid in the direction of the second axis 114. The gap 120 aids the deformation of the body portion 118 in the direction of the first axis 112. The gap 120 is formed between two overlapping portions 116a, 116b of the outer portion 116. Providing the gap 120 in this manner reduces the leakage through the gap 120 during operation.

As illustrated in FIG. 3, the piston ring 100 is substantially symmetrical about the second axis 114. Making the piston ring 100 symmetrical about this axis again ensures that the piston ring 100 has an even weight distribution.

The piston ring 100 is deformable between a first state in which an outer circumference of the piston ring 100 is substantially elliptical and a second state in which the outer circumference of the piston ring 100 is substantially circular. In the first state, the major axis of the ellipse aligns with the first axis 112 and the minor axis of the ellipse aligns with the second axis 114. The cavities 118a, 118b are configured such that the body portion 118 resists being compressed in the direction of the first axis 112. Therefore, in the second state, the body portion 118 applies a biasing force to the outer portion 116 of the piston ring 100 in the direction of the first axis 112. The body portion 118 thus biases the piston ring 100 towards the first state, i.e. the piston ring 100 assumes an elliptical shape when de-energised.

The body portion 118 has an inner circumferential surface 124 which is shaped to engage with a complimentary shaped inner and/or outer surface of the piston. The inner circumferential surface 124 has a circumference which is substantially rectangular. Mounting the piston ring 100 to a piston which is also rectangular prevents any rotational movement between the piston ring 100 and the piston. Furthermore, the body portion 118 contacts an outer surface of the piston which provides support to the piston ring 100 in the second axis 114. This assists in making the piston ring 100 relatively less resiliently deformable in the direction of the second axis 114 than in the direction of the first axis 112.

The piston ring 100 is mounted to a piston of a radial piston machine in the same manner as the piston ring 10 described above. However, since the piston ring 100 only has one gap 120 in the outer portion 116, it is possible to further reduce leakage between the piston and the piston housing by mounting two or more piston rings 100 to the piston such that the gaps 120 are alternately disposed on the second axis 114, as illustrated in FIG. 4. In this arrangement the gaps 120 are 180 degrees out of alignment with one another and located above or below a "solid" portion of the outer portion 116 of the piston ring 100. In addition to further improving the leakage between the piston and the piston housing, stacking multiple piston rings 100 in the manner described above ensures that the leakage is constant, i.e. since the piston rings 100 are prevented from rotating, it is not possible for the gaps 120 to come into alignment with one another. In a conventional piston with multiple piston rings, if the gaps randomly align with one another sharp increases in the leakage occurs.

Aligning multiple piston rings 100 in the manner described above prevents random high leakage occurring and makes the leakage consistent and predictable.

The piston ring 100 operates in the same manner as the piston ring 10 described above.

FIGS. 5 and 6 illustrate a further alternative embodiment of the piston ring 200 of FIG. 1. The piston ring 200 has first and second axes 212, 214 which are coplanar with piston ring 200.

The piston ring 200 has an outer portion 216 and a body portion 218. The outer portion 216 is split along the second axis 214 such that two diametrically opposed gaps 220 are formed in the piston ring 200. The gaps 220 are formed between two overlapping portions 216a, 216b of the outer portion 216.

The body portion 218 includes two cavities 218a, 218b. The cavities 218a, 218b have a first portion 218c which extends in a circumferential direction and a second portion 218d which extends in a radial direction.

The cavities 218a, 218b allow the body portion 218 to be resiliently deformable in the direction of the first axis 212 and substantially rigid in the direction of the second axis 214. The two diametrically opposed gaps 220 aid in the deformation of the body portion 218 in the direction of the first axis 212.

The piston ring 200 is substantially symmetrical about both first and second axes 212, 214. As described above, making the piston ring 200 symmetrical about both first and second axes 212, 214 ensures that the piston ring 200 has an even weight distribution, which reduces vibrations between the piston and the piston housing during use. Providing the cavities 218a, 218b with first circumferential portions 218c and second radial portions 218d allows the piston ring 200 to be symmetrical about both axes 212, 214.

The piston ring 200 is deformable between a first state in which an outer circumference of the piston ring 200 is substantially elliptical and a second state in which the outer circumference of the piston ring 200 is substantially circular. In the first state, the major axis of the ellipse aligns with the first axis 212 and the minor axis of the ellipse aligns with the second axis 214. The cavities 218a, 218b are also configured such that the body portion 218 resists being compressed in the direction of the first axis 212. Therefore, in the second state, the body portion 218 applies a biasing force to the outer portion 216 of the piston ring 200 in the direction of the first axis 212. The body portion 218 thus biases the piston ring 200 towards the first state, i.e. the piston ring 200 assumes an elliptical shape when de-energised.

The body portion 218 has an inner circumferential surface 224 which is shaped to engage with a complimentary shaped inner and/or outer surface of the piston. The inner circumferential surface 224 has a circumference which is substantially rectangular. Mounting the piston ring 200 to the piston which is also rectangular prevents any rotational movement between the piston ring 200 and the piston. Furthermore, the body portion 218 contacts an inner and outer surface of the piston which provides support to the piston ring 200 in the second axis 214.

This assists in making the piston ring 200 relatively less resiliently deformable in the direction of the second axis 214 than in the direction of the first axis 212.

As illustrated in FIG. 6, the piston ring 200 is frustoconical in shape. The piston ring 200 therefore has a trapezoidal cross section in the direction of the first or second axes 212, 214. Providing the piston ring 200 with a trapezoidal cross section ensures that the circumferential seal which the piston ring 200 makes with the piston housing 28 remains perpendicular to the longitudinal axis 36 of the piston 26 during operation.

This ensures that the force acting on the piston head 32 is parallel to the longitudinal axis 36 of the piston 26, which avoids side-load forces being applied to the piston 26. Any side-load forces increases the friction between the piston ring 200 and the piston housing 28.

The piston ring 200 is mounted to the piston 26 of a radial piston machine and operates in the same manner as the piston ring 10 described above.

The piston ring 10, 100, 200 therefore obviates or mitigates the disadvantages of previous proposals by providing a body portion 18, 118, 218 which is resiliently deformable in the direction of said first axis 12, 112, 212 and is substantially rigid in the direction of the second axis 14, 114, 214. Providing such a body portion 18, 118, 218 means that the piston ring 10, 100, 200 can easily change shape between a circle and an ellipse, i.e. the piston ring 10, 100, 200 is not subjected to excessive stress during the rapid elliptical deflections. This reduces the friction between the piston ring 10, 100, 200 and the piston housing 28, which increases the efficiency and lifespan of the machine. Reducing the stress applied to the piston ring 10, 100, 200 also increases its life and decreases the risk of failure of the ring. Furthermore, having a dedicated direction of deformation (i.e. the first axis 12, 112, 212) means that the piston ring 10, 100, 200 is capable of assuming approximate circular and elliptical shapes which are very close to the "perfect" circle and ellipse.

This improves the circumferential seal between the piston 26 and the piston housing 28, which reduces the leakage and increases the efficiency of the machine. Therefore, the piston ring 10, 100, 200 of the present invention offers a much improved performance in terms of leakage, friction and stress than previous proposals.

Providing a piston ring 10, 100, 200 as described above has the additional advantage that it facilitates the design of smaller sized radial piston machines. As described above, the size of a radial piston machine can be reduced by using "bent-axis" pistons, which allows the length of the piston housings to be reduced. The size of the radial piston machine is therefore inversely proportional to the angle which the piston axis makes to the piston housing at mid-stroke. The size of the angle is, however, limited by the performance of the piston ring. Typically, a bent-axis radial piston machine using conventional piston rings will have a maximum mid-stroke angle of approximately 5 degrees. However, the performance of the piston ring 10 of the present invention means that radial piston machine can be designed such that the angle which the piston axis makes to the piston housing at mid-stroke can be up to 10 degrees. This dramatically reduces the size, weight and cost of the machine.

Modifications and improvements may be made to the above without departing from the scope of the present invention. For example, although the spring members 22 are illustrated and described above as being formed integrally formed with the outer portion 16 of the piston ring 10, it should be appreciated that the spring members 22 may be formed separately from the outer portion 16.

Also, although the piston head 32 and piston housing 28 are illustrated and described above as being cylindrical, it should be appreciated that the piston head and piston housing may be of any other suitable shape, e.g. the piston head (or piston) may be spherical.

Furthermore, although the inner circumferential surface 24 of the piston ring 10, 100 has been described above as being generally rectangular, it should be appreciated that the inner circumferential surface could be any suitable shape which prevents the piston ring rotating with respect to the piston.

Also, although the piston base 34 has been illustrated and described above as having a cylindrical part surface 38 which engages with a corresponding outer surface 40 of the eccentric crankshaft 30 such that the piston 26 does not rotate with respect to the crankshaft 30, it should be appreciated that the piston base 34 and crankshaft 30 may have any suitable arrangement which allows them to engage and cooperate with one another such that the rotation of the piston is prevented.

Furthermore, although the piston ring 200 has been described and illustrated above as having a trapezoidal cross section, it should be appreciated that the piston ring 200 may have cross sections of other shapes, e.g. circular, rectangular etc.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A piston ring for forming a seal between a piston and a piston housing, said piston ring comprising:
   a first diametrical axis;
   a second diametrical axis orthogonal to the first diametrical axis;
   an outer portion that is split into two sections by two diametrically opposed gaps along the second diametrical axis; and
   a body portion comprising at least one biasing element integrally formed with the two sections of the outer portion so that the two sections of the outer portion are connected by the at least one biasing element;
   wherein said piston ring is symmetrical about said first diametrical axis and said second diametrical axis;
   wherein the at least one biasing element is configured to allow the body portion to be more resiliently deformable in the direction of said first diametrical axis and less deformable in the direction of the second diametrical axis.

2. The piston ring as claimed in claim 1, wherein said piston ring is deformable between a first state in which an outer circumference of said piston ring is substantially elliptical and a second state in which the outer circumference of said piston ring is substantially circular.

3. The piston ring as claimed in claim 1, wherein said at least one biasing element biases said piston ring towards a first state in which an outer circumference of said piston ring is substantially elliptical.

4. The piston ring as claimed in claim 1, wherein said body portion comprises two biasing elements, wherein said biasing elements are located on opposite sides of said first diametrical axis.

5. The piston ring as claimed in claim 4, wherein the two biasing elements are identical.

6. The piston ring as claimed in claim 4, wherein the two biasing elements have the same shape.

7. The piston ring as claimed in claim 1, wherein said biasing element is a spring member.

8. The piston ring as claimed in claim 1, wherein said outer portion comprises at least one cavity therein, said cavity being configured to allow said outer portion to be more resiliently deformable in the direction of said first diametrical axis and to be less deformable in the direction of said second diametrical axis.

9. The piston ring as claimed in claim 8, wherein, in a second state in which the outer circumference of said piston ring is substantially circular, said body portion biases said piston ring towards a first state in which an outer circumference of said piston ring is substantially elliptical.

10. The piston ring as claimed in claim 8, wherein said at least one cavity includes a first portion which extends in a circumferential direction and a second portion which extends in a radial direction.

11. The piston ring as claimed in claim 1, wherein, in use, said outer portion of said piston ring contacts an inner and/or outer surface of said piston, to prevent deformation of said body portion in the direction of said second diametrical axis.

12. The piston ring as claimed in claim 1, wherein said outer portion has an inner circumferential surface which is shaped so as to engage with a complimentary shaped inner and/or outer surface of the piston such that relative rotational movement between said piston ring and said piston is prevented.

13. The piston ring as claimed in claim 1, wherein said piston ring has a trapezoidal cross section in the direction of said first or second axes.

14. A piston assembly comprising a piston, a piston housing and at least one piston ring as claimed in claim 1.

15. The piston assembly as claimed in claim 14, wherein said piston and said piston housing are substantially cylindrical.

16. The piston assembly as claimed in claim 14, wherein said piston is non-rotatable relative to said piston housing.

17. A radial piston machine comprising:
at least one piston;
at least one piston housing; and
at least one piston ring as claimed in claim 1.

18. A piston ring for forming a seal between a piston and a piston housing, said piston ring comprising:
a first diametrical axis;
a second diametrical axis orthogonal to the first diametrical axis;
an outer portion that is split into two sections by two diametrically opposed gaps along the second diametrical axis; and
a body portion comprising at least one biasing element fixedly connected to the two sections of the outer portion so that the two sections of the outer portion are connected by the at least one biasing element;
wherein said piston ring is symmetrical about said first diametrical axis and said second diametrical axis;
wherein the at least one biasing element is configured to allow the body portion to be more resiliently deformable in the direction of said first diametrical axis and less deformable in the direction of the second diametrical axis.

* * * * *